United States Patent
Piehler

(10) Patent No.: US 10,422,633 B2
(45) Date of Patent: Sep. 24, 2019

(54) METHOD AND DETERMINATION DEVICE FOR DETERMINING A SURFACE SHAPE

(71) Applicant: Jabil Optics Germany GmbH, Jena (DE)

(72) Inventor: Eberhard Piehler, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 0 days.

(21) Appl. No.: 15/613,703

(22) Filed: Jun. 5, 2017

(65) Prior Publication Data

US 2017/0350693 A1 Dec. 7, 2017

(30) Foreign Application Priority Data

Jun. 6, 2016 (DE) .................. 10 2016 110 444

(51) Int. Cl.
| | | |
|---|---|---|
| *G01B 11/25* | (2006.01) | |
| *G01S 17/10* | (2006.01) | |
| *G01S 17/42* | (2006.01) | |
| *G01S 17/89* | (2006.01) | |
| *G01S 7/481* | (2006.01) | |

(52) U.S. Cl.
CPC .......... *G01B 11/25* (2013.01); *G01B 11/2522* (2013.01); *G01S 7/4814* (2013.01); *G01S 7/4816* (2013.01); *G01S 17/10* (2013.01); *G01S 17/42* (2013.01); *G01S 17/89* (2013.01)

(58) Field of Classification Search
CPC ... G01B 11/24; G01B 11/026; G01B 11/2518; G01B 11/25; G01B 11/2522; G06T 17/00
USPC .................................................. 356/601–623
See application file for complete search history.

(56) References Cited

U.S. PATENT DOCUMENTS

| | | | | |
|---|---|---|---|---|
| 4,979,815 A | * | 12/1990 | Tsikos ................ | G01B 11/2522 356/2 |
| 9,007,600 B2 | * | 4/2015 | Imaki ..................... | G01S 7/4816 356/4.01 |
| 9,285,477 B1 | * | 3/2016 | Smith ..................... | G01S 17/89 |
| 9,874,635 B1 | * | 1/2018 | Eichenholz ............. | G01S 17/00 |
| 2003/0053742 A1 | * | 3/2003 | Maruyama ............... | G02B 6/35 385/18 |
| 2006/0131483 A1 | * | 6/2006 | Schrey ................... | G01S 7/4816 250/214 R |
| 2006/0274329 A1 | * | 12/2006 | Kawano ................. | G01B 11/24 356/601 |
| 2011/0317172 A1 | * | 12/2011 | Tamiya ............... | G01B 11/0608 356/614 |
| 2013/0107016 A1 | * | 5/2013 | Federspiel ........... | H04N 13/254 348/49 |
| 2014/0016114 A1 | * | 1/2014 | Lopez .................. | G01C 15/002 356/4.01 |
| 2014/0111805 A1 | * | 4/2014 | Albert ..................... | G01V 8/10 356/369 |

(Continued)

FOREIGN PATENT DOCUMENTS

DE 102014104027 A1 9/2015

*Primary Examiner* — Hoa Q Pham
(74) *Attorney, Agent, or Firm* — Young Basile Hanlon & MacFarlane, P.C.

(57) ABSTRACT

The disclosure relates to a method and a determination device for determining a surface shape of an object. In order to build the determination device as compact as possible, according to the invention, the object is illuminated by an illuminating line and illuminating light reflected by the object is directed to a sensor line of the determination device.

10 Claims, 2 Drawing Sheets

(56) References Cited

U.S. PATENT DOCUMENTS

| | | |
|---|---|---|
| 2015/0268333 A1 | 9/2015 | Schneider et al. |
| 2016/0131633 A1* | 5/2016 | Schoenbach ............ G01J 5/047 374/121 |
| 2017/0131388 A1* | 5/2017 | Campbell ............. G01S 7/4812 |
| 2017/0153319 A1* | 6/2017 | Villeneuve ............. G01S 17/00 |
| 2018/0364356 A1* | 12/2018 | Eichenholz ........... G01S 17/105 |

* cited by examiner

METHOD AND DETERMINATION DEVICE FOR DETERMINING A SURFACE SHAPE

FIELD OF INVENTION

The disclosure relates to a method for determining a surface shape of an object, in which the object is illuminated by an illuminating line. Furthermore, the disclosure relates to a determination device for determining a surface shape of an object, comprising an illumination device and a recording device, where an illuminating line can be produced by means of the illumination device and distance information can be determined by means of the illuminating line.

BACKGROUND

A method and determination device for determining surface shapes are already known in general. The installation space for a determination device is limited, particularly if the surface shapes of objects are determined by small devices, for example a mobile computer, a tablet PC or a mobile phone and other mobile and possibly battery-operated devices. In various different devices (tablet PC, mobile phones, . . . ) the structural height of the device in particular is significantly limited in the direction of the surface to be determined. Known methods and determination devices for determining surface shapes require a lot of installation space however.

SUMMARY

Described herein is a method and a determination device for determining surface shapes, where the surface shape can be determined easily by a determination device which requires little installation space.

This objective is achieved for the aforementioned method in that illuminating light of the illuminating line reflected by the object is directed to a sensor line, where the surface shape is determined from run-time differences of different sections of the illuminating line. For the aforementioned determination device the objective is achieved in that the determination device comprises a sensor line and an optical element, wherein the optical element is designed to direct the illuminating line reflected by an object arranged in a detecting area of the optical element onto the sensor line and wherein the sensor line is a run-time sensor.

By means of the solution according to the disclosure, the surface shape can be determined by a particularly compact line sensor, so that the determination device can be built to be particularly compact.

The solution according to the disclosure can be improved further by different embodiments, which are themselves advantageous, and, unless otherwise indicated, combined with one another as desired. Said embodiments and the advantages associated with the latter are explained in the following.

In a first advantageous embodiment, the illuminating line can be moved at least once over the object, and illuminating light from the illuminating line reflected from different sections of the object can be directed onto the sensor line. In this way the surface shape of a larger area of the object can possibly be determined, even though only a one-dimensional sensor line and not a two-dimensional sensor arrangement is used for determining the surface shape.

In order to possibly also determine a movement of the object, the object can be illuminated twice with a time delay from two identical beam angles according to an embodiment. The reflected illuminating light can then be directed back to the line sensor. By means of the illuminating light which is radiated and/or received with time delay, a change in the position of the object and thus the movement of the object and/or even a change in the surface shape of the object can possibly be determined. The beam angles can be radiation angles of the illuminating light and/or ray angles of the illuminating light relative to an optical axis, for example the illumination device, or to an element of the illumination device, the device or the object.

Alternatively or in addition to the time-delayed illumination of the object with the illuminating light, according to an embodiment, the illuminating line can be moved multiple times over the object, in order to possibly determine changes in the surface shape and/or the position of the object.

For example, according to an embodiment, due to the time-delayed illumination and/or movement of the illuminating line over the object, gestures can possibly be recognised which are performed, for example, by the hand of a user of an electronic device. The device can possibly be operated by means of the gestures. Alternatively, the device can generate control signals for a further device on the basis of the gestures and possibly emit them to the latter.

According to an embodiment, pulsed illuminating light can be used to produce the illuminating line, where the run-time differences can possibly be determined more simply.

In an advantageous embodiment of the determination device, the optical element can be designed to direct the illuminating line to the object arranged in the detecting area and the illuminating line reflected by the object to the line sensor. Particularly with objects which reflect the illuminating light diffusely, the reflected illuminating line can possibly be directed easily to the line sensor. As the optical element is designed to direct the illuminating line both into the detecting area and to direct light reflected from the detecting area to the line sensor, it may not be necessary to provide additional optical elements for this, where the determination device can possibly be designed to be even more compact.

In order to possibly scan the surface shape of the object evenly or as easily as possible, according to an embodiment, the optical element can comprise a mirror which is tiltable or pivotable about at least one axis, for example a micro-mirror actuator, i.e. a microelectromechanical component for the dynamic modulation of light, which directs the illuminating line to the object and/or the illuminating line reflected by the object to the sensor line. According to an embodiment, the pivotable mirror can be part of a microscanner or area light modulator or an individual mirror.

According to an embodiment, the determination device and in particular the illumination device can be configured to emit pulsed illuminating light. For example, the light source of the illumination device can be a pulse laser or a surface emitter (e.g. a vertical-cavity surface-emitting laser (VCSEL)). Alternatively or additionally, according to an embodiment, the determination device can comprise a light valve and, for example, a liquid crystal light valve or a mechanical light valve, which runs through the illuminating light on its way from the light source to the detection area. By means of the pulsed illuminating light, changes in the surface shape and/or movements of the object can possibly be recognised quickly, particularly if the pulsed illuminating light is pulsed at a high frequency of more than 50 kHz, more than 1 MHz, up to 50 MHz or even up to one GHz or more.

According to an embodiment, the determination device can comprise an evaluation unit, which is transmitting the signal at least to the sensor line. In addition, according to an embodiment, the evaluation unit can also be transmitting a signal to the illuminating light source and/or the light valve. According to an embodiment, the evaluation unit can be designed to determine the surface shape by way of the run-time differences of different sections of the illuminating line the surface shape. The run-time differences are formed from the reflection of the illuminating line on the object, if parts of the partly illuminated surface of the object illuminated by the illuminating line are arranged further from the sensor line than other illuminated parts of the surface of the object. According to an embodiment, the sections of the illuminating line can be defined by sensor elements of the sensor line. According to an embodiment, each of the sensor elements can thereby define a section of the illuminating line. Such an evaluation unit can possibly be constructed easily and in a compact manner when using the line sensor. Alternatively, according to an embodiment, the evaluation unit can also be part of the device and software, for example, which can possibly be run on a processor of the device.

According to an embodiment, the determination device can comprise an imaging device forming the illuminating line. According to an embodiment, the imaging device can be designed to form the illuminating line between the optical element and the imaging device and at a distance of up to ten times, up to five times or up to three times the diameter of the illuminating line to the optical element. With an imaging device designed in this way, the pivotable mirror can possibly be arranged close to the focus point of the imaging device and in particular from the view of the imaging device behind its focus point or focus line. For example, according to an embodiment, the distance between the pivotable mirror can be arranged at a distance from the focus point which is less than ten times, less than five times and for example less than three times the diameter of the illuminating line. The diameter of the illuminating line is measured at right angles to its length. Possibly, the space required by the illumination device is reduced further in this way. According to an embodiment, the imaging device adds angle information to the illuminating light, whereby a linear focus is formed shortly behind the imaging device. The illuminating line is formed by the angle information over the distance.

For example, according to an embodiment, the imaging device can comprise a collimation optical system, for example with a rotationally symmetrical refractive surface, and a line generating optical system, for example a cylindrical refractive surface, wherein a beam splitter can be arranged between the collimation optical system and the line generating optical system. The beam splitter can let through or reflect the illuminating light on its way from the illuminating light source to the detecting area. The illuminating light coming back from the detection area and in particular reflected by the object can be reflected or let though by the beam splitter. According to an embodiment, the beam splitter can be a polarising beam splitter, such as a polarisation plate, a planar plate or a polarisation cube. In particular, according to an embodiment, the line generating optical system adds angle information to the illuminating light with, whereby a linear focus is formed shortly behind the line generating optical system. The illuminating line is formed by the angle information over the distance.

According to an embodiment, the collimation optical system and the line generating optical system can be designed as separate lenses, so that the beam splitter can possibly be arranged along the propagation path of the illuminating light between these two optical systems. Alternatively, according to an embodiment, the collimation optical system and/or the line generating optical system can be designed together with the beam splitter as a one-piece manipulatable component, so that not only the assembly of the illumination device is possibly simplified, but also the installation space required for the determination device is possibly reduced. The collimation optical system can then be referred to as the collimation side and the line generating optical system can be referred to as the line generating side.

According to an embodiment, the determination device can be designed to direct the illuminating line scattered by the object arranged in the detection area over or through the line producing optical system the beam splitter and the optical element to the sensor line. The space required may be reduced further in this way.

Between the line generating optical system and the optical element or the site at which the line generating optical system produces the illuminating line, or from the view of the imaging device behind the optical element, according to an embodiment, a polarisation optical element can be arranged which the illuminating light runs through on its way to the detecting area and from the detecting area back to the imaging device. According to an embodiment, the polarisation optical element is, for example, a $\lambda/4$ plate.

According to an embodiment, the polarisation optical element does not have a polarising effect; it only changes the polarisation properties. The illuminating light can thus be polarised twice (transmitter and receiver principle). If the illuminating light is directed through the polarisation optical element, the polarisation direction can be rotated by 90° and the beam splitter can effectively act as a polarisation beam splitter. The light of the illuminating light source can already be polarised relatively effectively. If highly polarised light is required, according to an embodiment, it is possible to insert a further polariser between the illuminating light source and beam splitter.

According to an embodiment, the sensor line can be the sensor line of a line sensor, where line sensors can possibly also be designed to be more compact with a comparable resolution than surface sensors so that the determination device can possibly be designed to be more compact than known determination devices.

According to an embodiment, the line sensor is a so-called time-of-flight sensor, i.e. a sensor which is designed to detect run-time differences of illuminating light. According to an embodiment, a line sensor can also be referred to as a row or scan sensor. According to an embodiment, all or at least a selection of the said components of the determination device and in particular all of the optical elements and sensors of the illumination device can be arranged in a common plane during the operation of the determination device, so that possibly only a small about of installation space is required for the illumination device in particular. According to an embodiment, the determination device can be designed in particular to perform the method according to the disclosure.

Exemplary embodiments of the disclosure are explained in the following with reference to the drawings. The different features of the embodiments can be combined independently of one another, as already shown in the individual advantageous embodiments.

In the latter:

Figure 1:
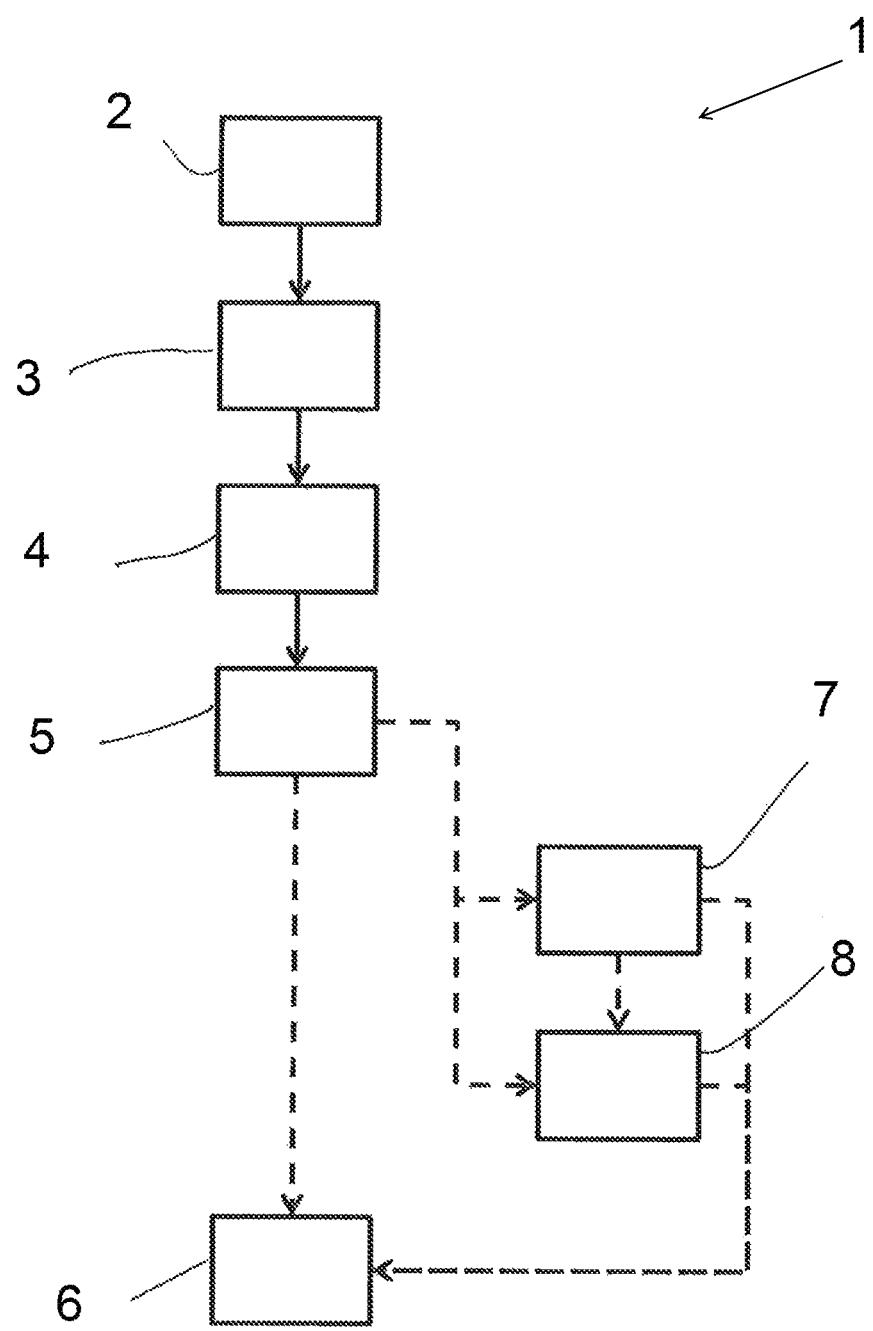
FIG. 1 shows a schematic representation of an embodiment of the method.

FIG. 1 shows schematically an embodiment of the method according to the disclosure for determining a surface shape of an object as a flow chart. The method 1 starts with a first method step 2, in which, for example, an illumination device for determining a surface shape is put into operation. Following method step 2 in method step 3 an illuminating line is produced. In particular, exactly one and not more than one illuminating line can be produced. The illuminating line can be produced as a temporarily continuous or as a pulsed illuminating line, wherein at least one illumination line pulse is produced.

Method step 3 can be followed by method step 4 in which an object, whose surface shape needs to be determined, is illuminated by the illuminating line. In the following method step 5 the illuminating line reflected by the object reflected can be directed to a line sensor. If the illuminating line is only partially reflected by the object, the portion of the illuminating line reflected by the object can be directed to the line sensor.

By having different spacings between sections of the object and the sensor line, possible run-time differences of different sections of the illuminating line in the now following method step 6, the surface shape of at least the part of the object illuminated by the illuminating line can be determined.

Between method step 5 and method step 6 at least one of the method steps 7 and 8 can be performed in addition. In method step 7 the illuminating line can be moved at least once or even multiple times over the object, in order to be able to scan a greater portion of the surface of the object in this way. For this purpose, for example, a relative movement can be used between the illumination device and the object. Alternatively, the illuminating line can be guided over the object by means of an optical element, even if the illumination device is not supposed to move relative to the object. In method step 8 the object can be illuminated by the illuminating line multiple times, for example twice with a time delay by identical beam angles, for example radiation angles, at which the illuminating light is radiated from the illumination device, or ray angles, at which the illuminating light hits the object. For this purpose, the illuminating line can be pulsed, for example. Alternatively, the object is consecutively illuminated by identical beam angles with a time delay, when the illuminating line is guided multiple times over the object.

Following method step 7 or method step 8, in method step 6 the surface shape can be determined. The method steps 7 and 8 can each be performed individually, consecutively or both in parallel.

Figure 2:
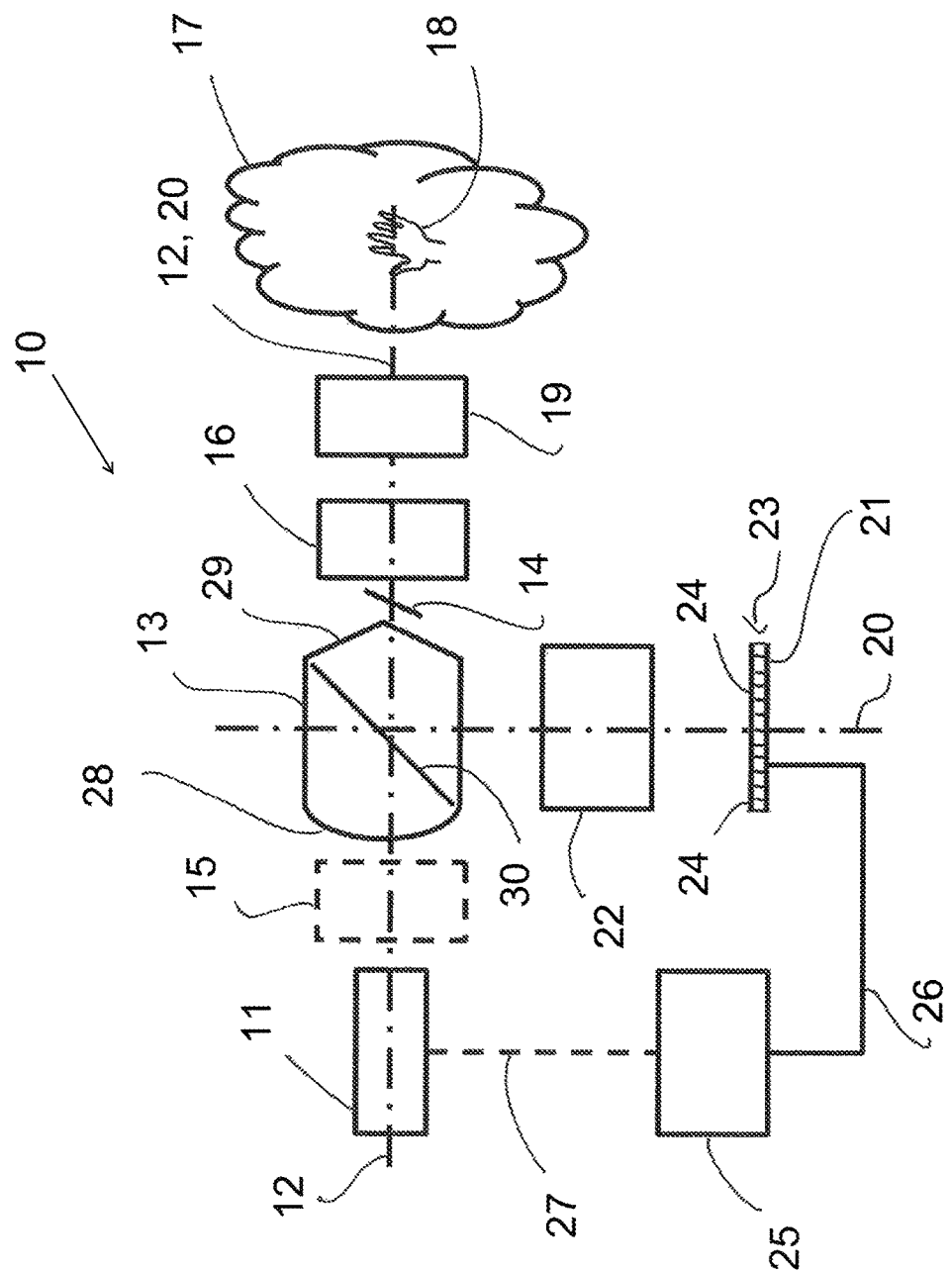
FIG. 2 shows a schematic representation of the determination device.

FIG. 2 shows schematically an embodiment of a determination device according to the disclosure. The determination device comprises an illumination device 10 with an illuminating light source 11, for example a laser diode or another suitable light source. During the operation of the illumination device 10 the illuminating light source 11 emits illuminating light along an optical axis, which is referred to in the following as an illumination axis 12. Along the illumination axis 12, an imaging device 13 can follow the illuminating light source 11. By means of the imaging device 13 the illuminating light emitted by the illuminating light source 11 is converted into an illuminating line 14. In the embodiment of FIG. 2 the illuminating line 14 would be located within the plane of the drawing and would thus be represented as a point on the illumination axis 12. In order to make the illuminating line 14 more visible in the Figure, it is shown in perspective as being transverse to the illumination axis 12. The imaging device 13 adds angle information to the illuminating light, where a linear focus is formed shortly behind the imaging device 13. The illuminating line is formed by the angle information over the distance.

For example, in order to collimate the illuminating light emitted by the illuminating light source 11, for example a laser diode, optical elements can be arranged along the illumination axis 12 between the illuminating light source 11 and the imaging device 13, which are not shown here for simplicity. Furthermore, along the illumination axis 12 between the illuminating light source 11 and the imaging device 13 a light valve 15 can be provided. By means of the light valve 15 illuminating light emitted continually by the illuminating light source 11 can be converted into pulsed illuminating light. If the illuminating light source 11 is itself able to emit pulsed illuminating light, the light valve 15 is not necessary.

Along the illumination axis 12 behind the imaging device 13 an optical element 16 can be arranged, which is designed to direct the illuminating line into a detecting area 17 of the determination device. The surface shape of an object 18 arranged in the detecting area 17 can be scanned by means of the determination device. The optical element 16 can be a reflecting optical element, for example a prism or a mirror. The optical element 16 can be mounted to be tiltable or pivotable about at least one axis, in order to pivot the illuminating line 14 over the detecting area 17. In order to design the illumination device to be compact the optical element 16 can comprise a micromirror actuator, also known as a microscanner or scanning micro-mirror. The micromirror actuator can have several lines of micromirrors and be a so-called DMD (digital micromirror device). Alternatively, it may be sufficient if the optical element 16 simply comprises a pivotable micromirror or a line of pivotable micromirrors, where the installation space required for the optical element 16 is reduced further.

Along the illumination axis 12 behind the imaging device 13 a polarisation optical element 19, for example a $\lambda/4$-plate, can be provided. The polarisation optical element 19 can be arranged between the imaging device 13 and the illuminating line 14, between the illuminating line 14 and the optical element 16, or along the illumination axis 12 behind the optical element 16 and in front of the detecting area 17. If the polarisation optical element 19 is arranged behind the optical element 16 the illuminating line 14 can be designed to be very close to the optical element 16, so that the installation spaced required for the determination device along the illumination axis 12 is reduced even further.

If the linear illuminating light hits the object 18 arranged in the detecting area 17, the illuminating light is scattered at least partly by the object 18 and reflected as measuring light along a measuring light axis 20 back to the determination device. At least between the imaging device 13 and the detecting area 17, the illumination axis 12 and the measuring light axis 20 can coincide so that the illuminating light spreads towards the detecting area 17 and the measuring light spreads away from the detecting area 17 along an identical path. The measuring light reflected by the object 18 passes through the polarisation optical element 19 and is directed by the optical element 16 back to the imaging device 13. The multiple use of at least the optical element 16 and the polarisation optical element 19 enables an even more compact structure of the illumination device 10, as no separate components are required for guiding the reflected measuring light.

The measuring light can be directed by means of an additional reflecting optical element to a sensor line of a line sensor 21. However, in order to make the determination device even more compact, the determination device can have a beam splitter, through which the illumination axis 12 and the measuring light axis 20 extend. The beam splitter can even be provided by the imaging device 13 so that the imaging device 13 not only forms the illuminating line 14 but also directs the reflected measuring light to the line sensor 21. In the beam splitter, i.e. for example in the imaging device 13, the measuring light axis 20 can separate from the illumination axis 12. In particular, the beam splitter can be designed as a polarisation beam splitter.

Along the measuring light axis 20 between the imaging device 13 and the line sensor 21 at least one additional optical element 22 can be provided, by means of which the reflected illuminating light—i.e. the measuring light—is directed onto the line sensor 21.

The line sensor 21 can comprise a sensor line 23 with a plurality of sensor elements 24. For example, the line sensor 21 is a so-called time-of-flight sensor.

The determination device can comprise an evaluation device 25, in which the surface shape of the object 18 is determined on the basis of sensor signals of the line sensor 21. In particular, the surface shape is determined from run-time differences of the measuring light reflected by the object 18. Different parts of the surface of the object 18 can be spaced at a distance along the measuring light axis 20, namely at varying distances from the individual sensor elements 24. If the illuminating light reflected by the object 18 at different time points hits some of various sensor elements 24, with reference to said run-time differences the surface shape can be determined by the evaluation unit 25. For this purpose the evaluation unit 25 is signal-transmitting and connected for example by means of a signal conductor 26 to the line sensor 21. Optionally the evaluation unit 25 can be connected by an additional signal conductor 27 in a signal-transmitting manner to the illuminating light source 11 and/or the light valve 15, wherein in the embodiment of FIG. 2, the optional signal conductor 27 leads to the illuminating light source 11. By means of the signal conductor 27 the times at which an illuminating light pulse is emitted can be transmitted to the evaluation device 25. Thus, run-time differences between the illuminating light source 11 or the light valve 15 and the different parts of the surface of the object 18 can also be taken into account when determining the surface shape of the object 18.

The imaging device 13 has a collimation side 28 facing along the measuring light axis 20 of the illuminating light source 11, by means of which the illuminating light emitted by the illumination source 11 is widened. The collimation side 28 can be designed as a rotationally symmetrical curved surface. On the side of the illumination device 13 opposite the collimation side 28 the latter can have a line-generating side 29. The line-generating side 29 can be designed to be cylindrical and, for example, wedge-shaped in order to produce the illuminating line 14. Between the collimation side 28 and the line generating side 29 the imaging device 13 can have an element, in particular the beam splitter 30, reflecting the illuminating light and/or the measuring light reflected by the object 18. The beam splitter 30 can be a polarising beam splitter, which lets through the illuminating light emitted by the illuminating light source 11 and reflects the measuring light reflected by the object 18, which has a different polarity than the illuminating light emitted by the illuminating light source 11. Alternatively, the beam splitter 30 can reflect the illuminating light emitted by the illuminating light source 11 and transmit the measuring light reflected by the object 18.

The imaging device 13 can be designed to have multiple parts and to have a separate collimation optical system, a separate beam splitter 30 and/or a separate line generating optical system. In the embodiment of FIG. 2 the imaging device 13 is shown as able to be handled in one piece, wherein the beam splitter 30 can be arranged between two segments of the imaging device 13 and adhered to the latter for example.

LIST OF REFERENCE NUMERALS

1 method
2 start
3 generate illuminating line
4 illuminate object with illuminating line
5 direct measuring light reflected by the object to line sensor
6 determine surface shape
7 move illuminating line over object
8 illuminate object multiple times with time delay with an identical beam angle
10 illumination device
11 illuminating light source
12 illumination axis
13 imaging device
14 illumination line
15 light valve
16 optical element
17 detecting area
18 object
19 polarisation optical element
20 measuring light axis
21 line sensor
22 optical element
23 sensor line
24 sensor element
25 evaluation unit
26, 27 signal conductor
28 collimation side
29 line generating side
30 beam splitter

What is claimed is:

1. A determination device for determining a surface shape of an object, comprising:
    an illumination device, wherein the illumination device produces an illumination line and distance information can be determined by the illuminating line,
    a sensor line, wherein the sensor line is a run-time sensor, and
    an optical element,
    wherein the optical element directs the illuminating line reflected by the object arranged in a detecting area of the optical element onto the sensor line, wherein
    the illumination device comprises an imaging device shaping the illuminating line with a collimation optical system and
    a line generating optical system, wherein
    a beam splitter is arranged between the collimation optical system and the line generating optical system.

2. The determination device according to claim 1, wherein the optical element directs the illuminating line to the detecting area and directs the illuminating line reflected by the object arranged in the detecting area to the sensor line.

3. The determination device according to claim 1, wherein the illumination device is set up to emit pulsed illuminating light.

4. The determination device according to claim 1, wherein the determination device comprises an evaluation unit, which transmits a signal at least to the sensor line and determines the surface shape with reference to run-time differences of sections of the illuminating line.

5. The determination device according to claim 1, wherein the determination device directs the illuminating line scattered back from the object arranged in the detecting area through the line generating optical system, the beam splitter and the optical element to the sensor line.

6. The determination device according to claim 1, wherein between the imaging device and the detecting area a polarisation optical element is arranged.

7. The determination device according to claim 1, wherein the sensor line is the sensor line of a line sensor.

8. The determination device according to claim 1, wherein the determination device comprises a light valve arranged between an illuminating light source and the imaging device.

9. The determination device according to claim 1, wherein the collimation optical system, the line generating optical system and the beam splitter are designed as a one-piece manipulatable component.

10. A determination device for determining a surface shape of an object, comprising:
- an illumination device, wherein the illumination device produces an illumination line and distance information can be determined by the illuminating line;
- a sensor line, wherein the sensor line is a run-time sensor;
- an optical element,
- wherein the optical element directs the illuminating line reflected by the object arranged in a detecting area of the optical element onto the sensor line, and
- wherein the illumination device comprises an imaging device shaping the illuminating line with a collimation optical system; and
- a line generating optical system,
- wherein a beam splitter is arranged between the collimation optical system and the line generating optical system; and
- wherein the sensor line is a one-dimensional sensor line composed of at least three sensor elements adjoined to each other.

\* \* \* \* \*